(12) United States Patent
Raina et al.

(10) Patent No.: US 9,589,402 B2
(45) Date of Patent: *Mar. 7, 2017

(54) RESTRICTED AREA ACCESS CONTROL SYSTEM

(71) Applicant: Accenture Global Services Limited, Dublin (IE)

(72) Inventors: Sunil Raina, Issaquah, WA (US); Avishek Somani, Toronto (CA); Alden Cuddihey, Kanata (CA); Scott Thomas Butler, Oakville (CA); Douglas Arthur Michael Archibald, Kanata (CA)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,825

(22) Filed: Aug. 18, 2015

(65) Prior Publication Data

US 2016/0055697 A1    Feb. 25, 2016

Related U.S. Application Data

(63) Continuation-in-part of application No. 14/468,188, filed on Aug. 25, 2014.

(51) Int. Cl.
*G08B 29/00* (2006.01)
*G07C 9/00* (2006.01)
(Continued)

(52) U.S. Cl.
CPC ...... *G07C 9/00111* (2013.01); *G07C 9/00309* (2013.01); *G07C 9/025* (2013.01);
(Continued)

(58) Field of Classification Search
CPC .. G07C 9/00; G07C 9/00007; G07C 9/00015; G07C 9/00023; G07C 9/00031;
(Continued)

(56) References Cited

U.S. PATENT DOCUMENTS 5,485,347 A * 1/1996 Miura ................... G06M 1/101
                                                104/28
7,255,264 B2   8/2007 De Leon
(Continued)

FOREIGN PATENT DOCUMENTS

CN    104392501    3/2015
CN    105243689    1/2016
(Continued)

OTHER PUBLICATIONS

"The extended European search report" on EP patent application No. 15196185.1, European Patent Office, dated Feb. 22, 2016, 7 pages.

(Continued)

*Primary Examiner* — Ryan Sherwin
(74) *Attorney, Agent, or Firm* — Mannava & Kang, P.C.

(57) ABSTRACT

An access control system controls access to a restricted area. A mobile device exchanges messages with a backend server to validate a user and to control an actuator for a physical barrier responsive to validation. Beacon-based unique identifiers are calculated at validation time for the current location to facilitate the validation.

20 Claims, 11 Drawing Sheets

(51) Int. Cl.
*H04W 4/02* (2009.01)
*G07C 9/02* (2006.01)
*H04W 12/00* (2009.01)
*H04W 88/02* (2009.01)

(52) U.S. Cl.
CPC ........... *H04W 4/021* (2013.01); *H04W 12/00* (2013.01); *G07C 2009/00412* (2013.01); *H04W 88/02* (2013.01)

(58) Field of Classification Search
CPC ............ G07C 9/00039; G07C 9/00103; G07C 9/00111; G07C 9/00119; G07C 9/00174; G07C 9/00309; G07C 9/00571; G07C 9/00817; G07C 9/00857; G07C 9/02; G07B 15/00; G07B 15/04; H04W 4/021; H04W 88/02; H04W 12/00
See application file for complete search history.

(56) References Cited

U.S. PATENT DOCUMENTS

| | | | |
|---|---|---|---|
| 7,567,920 B2* | 7/2009 | Hammad | G06Q 20/32 705/13 |
| 7,731,086 B2* | 6/2010 | Saunders | G06Q 20/10 235/380 |
| 8,326,221 B2 | 12/2012 | Dorsey | |
| 8,369,842 B2 | 2/2013 | Proctor, Jr. | |
| 8,781,502 B1 | 7/2014 | Middleton et al. | |
| 8,856,916 B1* | 10/2014 | Sobel | G06F 12/14 726/17 |
| 9,204,257 B1 | 12/2015 | Mendelson | |
| 2001/0045886 A1* | 11/2001 | Minowa | H04W 84/022 340/7.45 |
| 2005/0070257 A1 | 3/2005 | Saarinen et al. | |
| 2005/0093697 A1* | 5/2005 | Nichani | G06K 9/00778 340/545.1 |
| 2005/0233789 A1 | 10/2005 | Maekawa | |
| 2006/0214815 A1* | 9/2006 | Komatsu | H04B 10/1143 340/956 |
| 2006/0242908 A1* | 11/2006 | McKinney | E05F 15/77 49/280 |
| 2007/0276765 A1 | 11/2007 | Hazel | |
| 2010/0066503 A1* | 3/2010 | Rhie | G01S 1/68 340/10.1 |
| 2011/0137773 A1 | 6/2011 | Davis, III | |
| 2011/0153495 A1 | 6/2011 | Dixon et al. | |
| 2012/0235812 A1 | 9/2012 | Maia et al. | |
| 2012/0254040 A1 | 10/2012 | Dixon et al. | |
| 2013/0090134 A1 | 4/2013 | Heshmati | |
| 2013/0165157 A1 | 6/2013 | Mapes | |
| 2013/0201286 A1* | 8/2013 | Schockmel | G07C 9/00111 348/46 |
| 2013/0322674 A1 | 12/2013 | Ren et al. | |
| 2013/0332007 A1 | 12/2013 | Louboutin | |
| 2014/0095227 A1 | 4/2014 | Parker et al. | |
| 2014/0273857 A1 | 9/2014 | White et al. | |
| 2014/0344036 A1 | 11/2014 | Serad | |
| 2015/0042451 A1* | 2/2015 | Matsumoto | G01C 21/165 340/5.61 |
| 2015/0120558 A1 | 4/2015 | Andrews | |
| 2015/0289207 A1 | 10/2015 | Kubo | |
| 2015/0289295 A1 | 10/2015 | Granbery | |
| 2016/0007184 A1 | 1/2016 | Kulikov | |
| 2016/0019726 A1 | 1/2016 | Joy et al. | |
| 2016/0044460 A1 | 2/2016 | Cornaby | |
| 2016/0073264 A1 | 3/2016 | Van den Broeck | |
| 2016/0087959 A1 | 3/2016 | Park | |

FOREIGN PATENT DOCUMENTS

| | | |
|---|---|---|
| WO | 2015100185 | 7/2015 |
| WO | 2015123378 | 8/2015 |

OTHER PUBLICATIONS

"The Partial European search report", European Patent Application No. 15182143.6, European Patent Office, dated Jan. 21, 2016, 7 pages.
Radius Networks, "How to Pop a Pass Using iBeacon Technology", http://developer.radiusnetworks.com/blog/ Downloaded on Nov. 28, 2015, 19 pages.
Masabi, "Transport Operators and Barcode M-Ticketing", London, UK, download date Oct. 28, 2015. http://www.masabi.com/wp-content/uploads/2011/02/Transport-Operators-and-Barcode-mTicketing.pdf.
HopOn, "HopOn Beacon", download date Oct. 28, 2015, 9 pages. http://hopon.co/technology/.
Two Canoes, "Bleu Meetings", download date Oct. 28, 2015, 5 pages. http://twocanoes.com/products/online-services/bleu-meetings.
MTA, "LIRR Seeking Development of Train Ticketing App", Jan. 26, 2013, 2 pages. http://www.mta.info/news/2013/01/26/lirr-seeking-development-train-ticketing-app.
Intercom, "How Mobile Ticket delivery works?", download date Oct. 29, 2015, 3 pages. http://www.intercom.ee/mobile-ticketing-works.

* cited by examiner area of validation
300 ns, according to an example of the present disclosure;

RESTRICTED AREA ACCESS CONTROL SYSTEM

PRIORITY

The present application is a continuation-in-part of patent application Ser. No. 14/468,188, filed Aug. 25, 2014, which is incorporated by reference in its entirety.

BACKGROUND

For a variety of situations and reasons, it may be desirable to control people's access to an area of interest. For example, it is not uncommon to include a gate to block entrance to a parking lot or secured facility. In another example, mass transit systems, such as subways, often include some form of entrance control to enforce fare payment to ride the subway. Also, other places, like concert halls, stadiums, etc., still have conventional paper tickets, and people are employed to physically validate each individual ticket.

Controlling access to these areas is often automated. For example, a user has a card key, and a reader is installed at a gated entrance. To gain access to the area, the user inserts his card key into the reader or places it in very close proximity to the reader so the reader can read the card key. The information transmitted from the card key may be an ID and/or other information for the user and is processed through appropriate business rules to determine if the user is authorized to access the area. If the user is determined to be authorized, the gate is opened and the user is allowed access. In some systems, additional or different determinations are made to determine whether a user is granted access to the restricted area. For example, for mass transit systems, a determination is made as to whether the user has paid a fare or has sufficient funds in an account to pay a fare so it may be deducted after the user travels on the mass transit system.

It is a major inconvenience for the user to have to carry an additional card key and physically present the card key to the reader to gain access to the restricted area. To manufacture and disseminate the card keys for the systems is an expense. Furthermore, the security of conventional systems is not optimal. In conventional systems, security codes used to validate the card keys are often stored on readers, and encoded into the card keys. They are highly susceptible to hacking and as a result create a vulnerability of providing unauthorized access to restricted areas.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
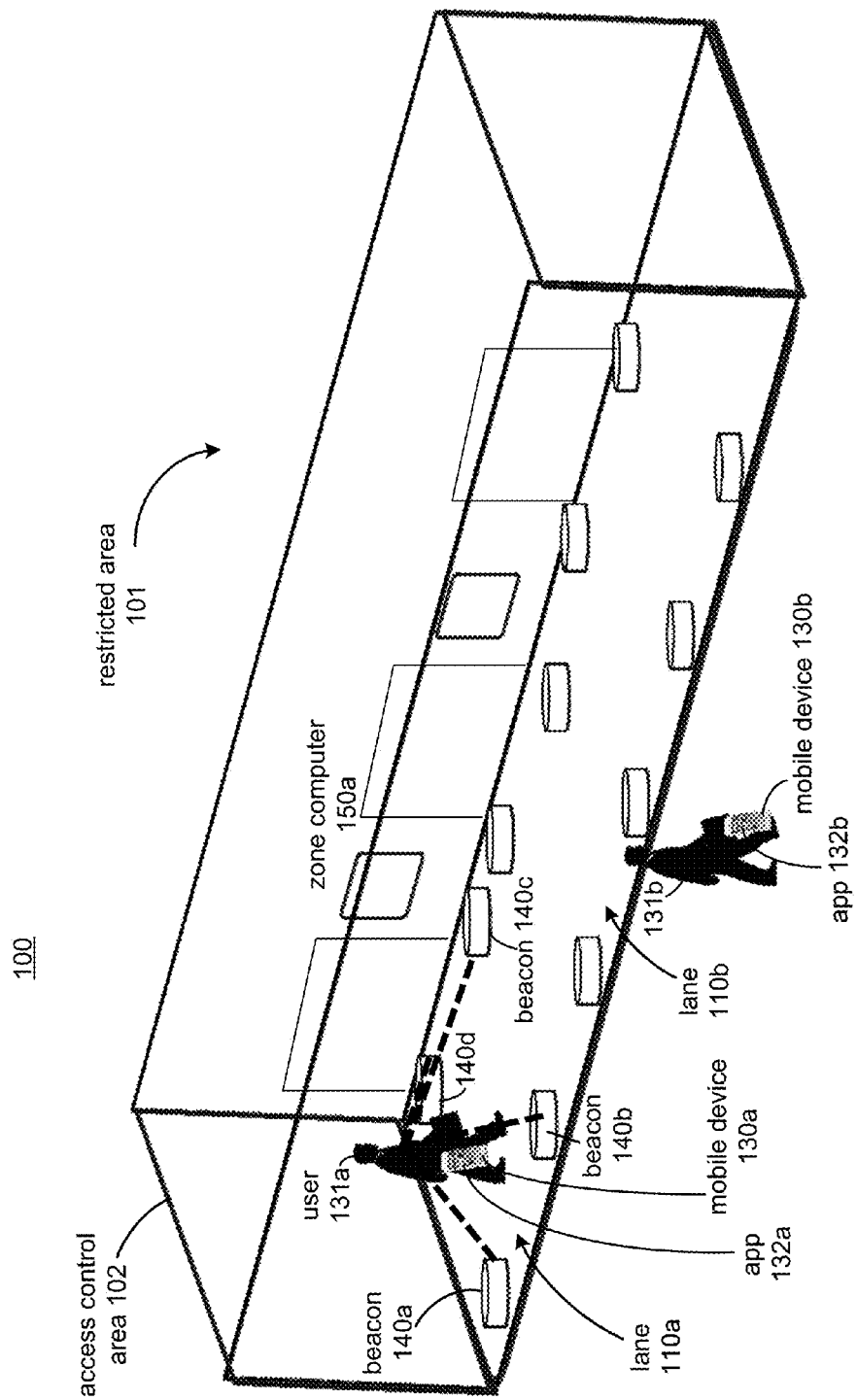
FIG. 1 illustrates a secure short-distance-based communication and access control system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A secure short-distance-based communication and access control system controls access to a geographic area. The system may be employed in an entry to a restricted area to control physical access to the area. The system employs low-powered beacons, such as Bluetooth beacons, IBEACON, Bluetooth enabled computers running an application in peripheral mode, a Bluetooth tag acting as a peripheral or the like, and zone computers at multiple sub-locations associated with accessing the restricted area. Individuals communicate through their mobile devices, which can execute an application for validation, such as fare payment, with the beacons and the zone computers to gain access to the restricted area. The system includes mechanical barriers that are actuated in response to electronic authentication and validation of an individual to allow access to the restricted area. In one example, the sub-locations are fare gate lanes. For example, as an individual walks into the restricted area, their mobile device will determine its location, for example, from beacons signals in its current vicinity and engage in validation with a local zone computer if the mobile device determines it is in an area of validation for the local zone computer. For example, the user's mobile device may use the beacons to verify the position of user, and once the position is verified, enable interaction with the correct zone computer to validate the user and open the gate. In another example, the zone computer may use the beacons to verify the position of the user, and once the position is verified, enable the local zone computer to initiate interaction with the mobile device to validate the user and open the gate.

The system facilitates secure communication through short-distance-based communication between the mobile devices and the zone computers and through on-the-spot unique identifiers generated by the mobile devices. The unique identifiers enable the secure communication between the mobile devices and the zone computers. Each unique identifier may be generated for a specific mobile device at its current location proximal to a zone computer. Unique identifiers may be determined or derived or calculated or computed from signals or broadcast packets received from the beacons for the current location of the mobile device. For example, the unique identifiers are unique to the current location and time of the mobile device when it transmits the unique identifiers to the zone computer associated with the sub-location where the mobile device is located. Also, a user's existing mobile device may be employed to gain access to the restricted area. For example, an access control application is loaded on the user's mobile device to enable access to the restricted area. Short-distance-based communication for message exchange between the mobile device and a zone computer is employed by the system so the user does not need to physically place a card key on a reader to access the restricted area. Instead, the mobile device may remain in the user's pocket or bag and engage in activation and validation processes with the zone computer and other external computers if needed to gain access to an area. Additionally, the system may include multiple lanes of access to the restricted area that are in close proximity but the system employs techniques to minimize or prevent cross-talk between mobile devices and zone computers in the multiple lanes to facilitate secure message exchange and validation of multiple users simultaneously in different lanes of entrance to the restricted area. The messages exchanged between the mobile device and the zone computer may be encrypted or enciphered or MACed using one or more encryption keys valid only for the current sub-location, mobile device and time. Also, an application running on the mobile device that facilitates security and other functions can easily be remotely updated over a network. However, smartcards do not support this feature. The secure communication, cross talk minimization, and application updating of the secure short-distance-based communication and access control system represent significant technical advantages over existing area access control systems.

FIG. 1 illustrates a secure short-distance-based communication and access control system 100, referred to as the system 100. The system 100 is employed at an access control area 102 for a restricted area 101. The restricted area 101 may be a geographic area or location. The geographic area may be a building, a room in a building, an area in an outdoor environment, or any geographic area that may be physically located in a physical structure, which may be stationary or mobile. The area 101 is referred to as "restricted" because access to the area is controlled by the system 100. The access control area 102 is the geographic area where access to the restricted area 101 is controlled by the system 100. For example, the access control area 102 is located at an entrance or exit to the restricted area 101. Controlling access to the restricted area 101 may include controlling entry to the restricted area 101 and/or exiting from the restricted area 101. Furthermore, the access control area 102 may be divided into a plurality of sub-locations, such as lanes 110, where validation occurs to allow or deny access to the restricted area 101. The plurality of sub-locations allows multiple users to be validated simultaneously.

The system 100 controls access to the restricted area 101 by authenticating and validating users trying to gain access to the restricted area 101. User refers to anyone or anything trying to gain access to the restricted area 101. Also, the system 100 may include or control physical barriers that are actuated or not actuated to allow or deny access to the restricted area depending on whether a user is authenticated and validated. Also, the system 100 is generally described as used at an entrance to the restricted area 101, but the system may be used at an exit to the restricted area or other locations.

The system 100 may include end user mobile devices 130 that can each run an access control application 132 to exchange information with beacons 140 and zone computers 150 to facilitate access control for the restricted area 101. The mobile devices 130 may include mobile devices 130a and 130b shown for users 131a and 131b respectively to illustrate that users can use mobile devices to gain entry to the restricted area 101. Of course, any number of individuals using mobile devices may be validated by the system 100 to gain access to the restricted area 101. Also, multiple beacons (like Bluetooth beacons, IBEACONS, Wi-Fi access points, etc.) 140, including beacons labeled 140a-d, and multiple zone computers 150, including zone computers labeled 150a-b, are shown, however, any number of beacons and zone computers may be included in the system 100 depending on various factors, such as how many users need to be processed simultaneously to control access to the restricted area 101. Each zone computer may be associated with a different sub-location in the access control area 102.

The beacons 140 are hardware that can broadcast beacon signals. The beacons 140 may be standalone devices or incorporated into another system. A zone computer may have a beacon. The beacons 140 broadcast beacon signals at a short distance, such as up to 10 meters or a much shorter distance, such as up to 4 centimeters. For example, the beacons 140 may be Bluetooth, Bluetooth Low Energy, or near-field communication beacons, or Wi-Fi and the range of each of these type of communication protocols is described below. The beacons 140 may be part of a local positioning system, such as IBEACONS, that are used to wirelessly determine the position of the mobile devices 130 inside the restricted area 101.

The mobile devices 130 may be any computer that a user may carry and that can run applications including the access control applications 132. Examples of the mobile devices 130 include mobile phones, tablets, wearable computers, such as GOOGLE glass or smart devices embedded into clothing, a smart watch, fitness tracker, or wireless enabled shoes, or some other type of mobile computer. The mobile devices 130 may include short-distance wireless communication interfaces that can wirelessly communicate with beacons 140 and zone computers 150 when in proximity to the beacons 140 and the zone computers 150. Also, in addition to receiving signals from the beacons 140, the mobile devices 130 themselves may operate as a beacon and broadcast a beacon signal or act as a peripheral, enabling services and/or characteristics, or act as a central and start searching for peripherals with certain services and/or characteristics and/or name and/or other unique identifiers. The mobile devices 130 may include a beacon. In one example, a short-distance communication interface in a mobile device can broadcast a beacon signal to initiate communication with a local zone computer as is further described below, and the beacon signal is dynamically generated. In one example, the short-distance wireless communication interfaces may include near-field communication (NFC) interfaces. NFC is a set of standards for smartphones and other mobile devices to establish radio communication with each other and other computers by touching them together or bringing them into close proximity. The close proximity may be a few inches or few centimeters (e.g., 4 centimeters). Other wireless interfaces may be used. For example, Bluetooth may be used and has a longer range, but may consume more battery power and is more susceptible to cross talk. In another example, Bluetooth Low Energy (BLE) or Bluetooth 4.0 or future versions of Bluetooth wireless interfaces may be used. BLE is a wireless technology that is intended to provide reduced power consumption when compared to Bluetooth but has a similar range to Bluetooth. The components of the system 100 may have one or multiple types of short-distance wireless interfaces, which may have ranges from a few centimeters to a few meters. In another example, the range is up to 100 feet. The zone computers 150 and beacons 140 include wireless interfaces to communicate with the mobile devices 130 and other computers as needed. As described above, examples of the wireless interfaces may include near field communication interfaces, Bluetooth communication interfaces and/or BLE communication interfaces but other short-distance wireless interfaces may be used. The zone computers 150 and mobile devices 130 may utilize other communication interfaces as well, which are wired or wireless and may be network interfaces, but communication between the beacons 140 and the mobile devices 130 and communication between the zone computers 150 and the mobile devices 130 for the system 100 may rely on short-distance wireless interfaces for communication with each other. The mobile devices 130 include a short-distance interface that matches the beacons signals broadcast from the beacons 140. So if the beacons 140 broadcast Bluetooth signals, the mobile device 130 at least include a Bluetooth interface to receive the signals, and so on.

The zone computers 150 validate the users 131 through their mobile devices 130. The zone computers 150 may include beacons but are not required to include the beacons. The zone computers 150 for example are validators. For example, a zone computer may be a fare payment device that can interact with a mobile device to deduct money or otherwise accept payment for a fare.

The beacons 140 may be embedded in a physical infrastructure, such as a housing for a lane-based entry system or a barrier-type infrastructure. The beacons 140 may broadcast a message every x milliseconds (ms), where x>1 ms and may be less than 200 ms but other intervals may be used and the intervals may depend on the environment and use case. The message may be a unique identifier (ID) or a set of unique IDs or a combination of generic IDs and unique IDs. In one example, at least one part of the ID is generic and the other part is unique. In one example, the ID may include a universally unique identifier (UUID) a major ID and/or a minor ID. For example, one of the identifiers is generic (e.g., UUID and/or the major ID) and may be the same for all beacons that belong to or are for a particular entity, such as for the same company or the same mass transit system, or may vary between different entities or restriction level within the same company or mass transit system, like different unique ID between rail, subway and bus, or different unique IDs between different floors within a secured facility. The other unique ID (e.g., minor ID) may help identify a particular location or sub-location. For example, the major ID may be the same for all beacons that belong to a particular location within the system, such as a specific rail station or a bus stop, or vary within the same location, such as different major ID for different entrances in a rail station. The minor ID may be different and unique to the beacon and can be associated with a particular sub-location within a location. For example, a minor ID may be for a particular lane at an entry point.) For example, FIG. 1 shows entrances for lanes 110a and 110b. one of the unique identifiers (e.g. minor ID) may be different but consecutive for the beacons 140a-d because they are for the same lane 110a or are for adjacent lanes, but, each beacon has one or more of the unique identifiers that are same (e.g. major ID) because they are for the same entry point, the same rail station and/or belong to the same entity, such as the same mass transit system. In another implementation, the unique identifiers may be assigned using a mathematical function, such that the mobile device or the zone computer can calculate the location and sub-location information from the unique identifiers broadcasted by the nearby beacons.

The mobile devices 130 listen for the broadcasts from the beacons 140, which may contain the unique identifiers for each beacon, or inputs from which the unique identifiers may be calculated or computed or derived or looked up in an internal data store. When a mobile device is in range of one or more of the beacons 140, unique identifiers received from the beacons at the mobile device may invoke a detection mode in the mobile device to determine whether the mobile device is at an entry point controlled by the system 100. For example, the mobile device determines whether it is in an entrance lane, such as the lane 110a or the lane 110b, for entering the restricted area 101. The unique identifiers, signal strength (such as received signal strength indicator (RSSI), transmission power, and/or received Power) of the beacon's broadcasts, broadcast zone, broadcast accuracy, azimuth and angle of the beacon (e.g., calculated from the received wireless broadcast) help identify the location of the mobile device. If the mobile device detects that it is in an area of validation, such as an entry point controlled by the system, it enables validation mode. This may involve the mobile device getting into a peripheral mode, wherein the mobile device may start sending message broadcasts over the wireless interface (e.g. Bluetooth 4.0), like a beacon. For example, the mobile device acts as a Bluetooth peripheral and advertises, broadcasts, transmits, and/or enables its services and/or characteristics using one or more of the unique IDs calculated above. The zone computer may use the unique IDs to identify the mobile device or the services/characteristics advertised, broadcasted, transmitted, and/or supported by the mobile device or the fare payment application on the mobile device. In another example, the zone computer broadcasts a services message indicating that it is available for validation and the mobile device ID calculated by the zone computer is included in the services message. The mobile device receives the services message, determines whether the mobile device ID in the services message matches the mobile device ID calculated by the mobile device, and if it does match, initiating a message exchange for authentication and validation.

In another example, the establishing of communication between a mobile device and a zone computer may include the zone computer scanning for a mobile device in range. The zone computer checks signal strength, etc. to determine if a mobile device falls within its sub-location. If so, the zone computer connects to the mobile device and then runs a service discovery to check for available services/characteristics of the mobile device. If the zone computer finds the services it is interested in, it continues or else disconnects with the peripheral (i.e., the mobile device). In yet another example, the mobile device determines a name (e.g., a local name) from information in a beacon signal and includes it in information broadcasted from the mobile device. The zone computer receives the broadcast and determines whether it includes the local name. If so, the zone computer determines that the mobile device is to be validated.

The zone computers 150 include computers that may be provided for each entry point or each sub-location at an entry point (e.g., each lane) for authentication and validation of users to access the restricted area 101. A zone computer may support one lane or may support multiple lanes. In one implementation, the zone computers 150 are looking for mobile devices which are broadcasting, advertising, and/or transmitting a specific unique ID or IDs and/or supporting services and/or characteristics with a specific unique ID or IDs, signal strength, location or a combination of them or all. Once a zone computer detects a mobile device that matches the criteria, the zone computer may connect to the mobile device via the wireless interface (e.g. Bluetooth 4.0 or BLE or future versions of Bluetooth, Wi-Fi, etc.) and may begin the authentication process, which may then be followed by the message exchange for validation. The zone computers 150 engage in message exchange and processes with the mobile devices 130 for validation for example after the mobile devices detect that they are at an entry point. For example, after the mobile device detects it is at an entry point or sub-location at an entry point, it may activate payment mode, which then results in a process to be executed to establish a secure communication channel between a mobile device and a zone computer through run-time key generation, which may be based on the unique user credentials, unique IDs of beacons and other information. Validation may include determining whether the user is allowed to enter the restricted area 101. In one example, validation may include fare-based validation, such as when payment of a fare is required to enter or exit the restricted area 101. Detection, secure message exchange and validation are described in detail below. The zone computers 150 may be provided locally at the sub-locations of an entry point. The zone computers 150 may be connected to a back-end server via the Internet or another wide area network to provide updates and perform other functions.

Figure 2:
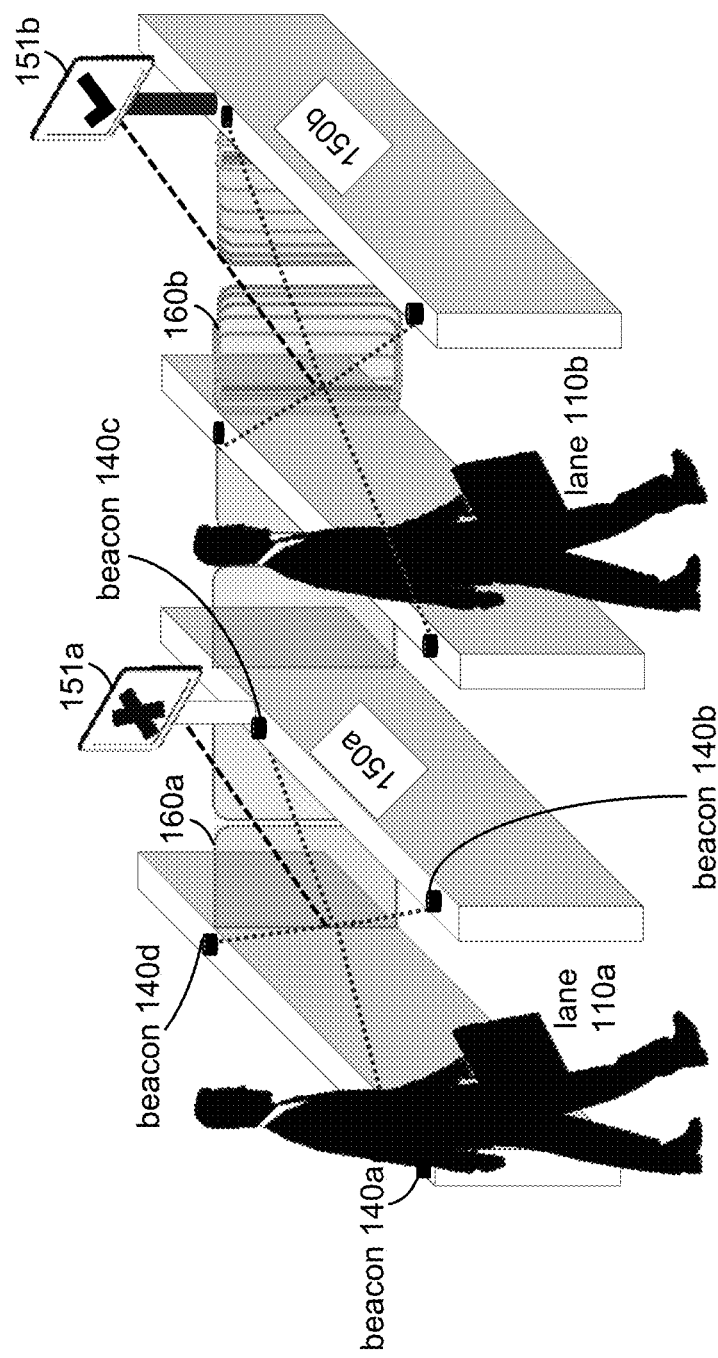
FIG. 2 shows an example of lanes that may be sub-locations of an entry point for a restricted area.

FIG. 2 shows an example of the lanes 110 that may be sub-locations of an entry point for the restricted area 101. As shown in FIG. 2, the beacons 140 and/or the zone computers may be embedded in the physical structures of the lanes 110. The zone computers 150 may electronically control movable physical barriers 160. Each electronically-controlled movable physical barrier may be located in a different sub-location of a plurality of sub-locations of an access control area associated with the restricted area, such as gates 160a-b, to allow or deny access to the restricted area 101. Also, the zone computers 150 may be connected to displays 151, such as displays 151a-b, to provide indication to the user of whether they are approved to enter the restricted area or not. Other information may also be displayed. For example, an arrow indicates a lane is open. The check mark shown on the display 151b indicates a person is validated and the gate opens. If the person is not validated, the display may show an X, such as on display 151a, and may provide additional information, such as "See Attendant" or "Insufficient Funds" if the user's account does not have sufficient funds to pay a fare. Also, external systems may be invoked, such as to alert attendants or to automatically replenish funds in a user's account or change user's access privileges.

Figure 3:
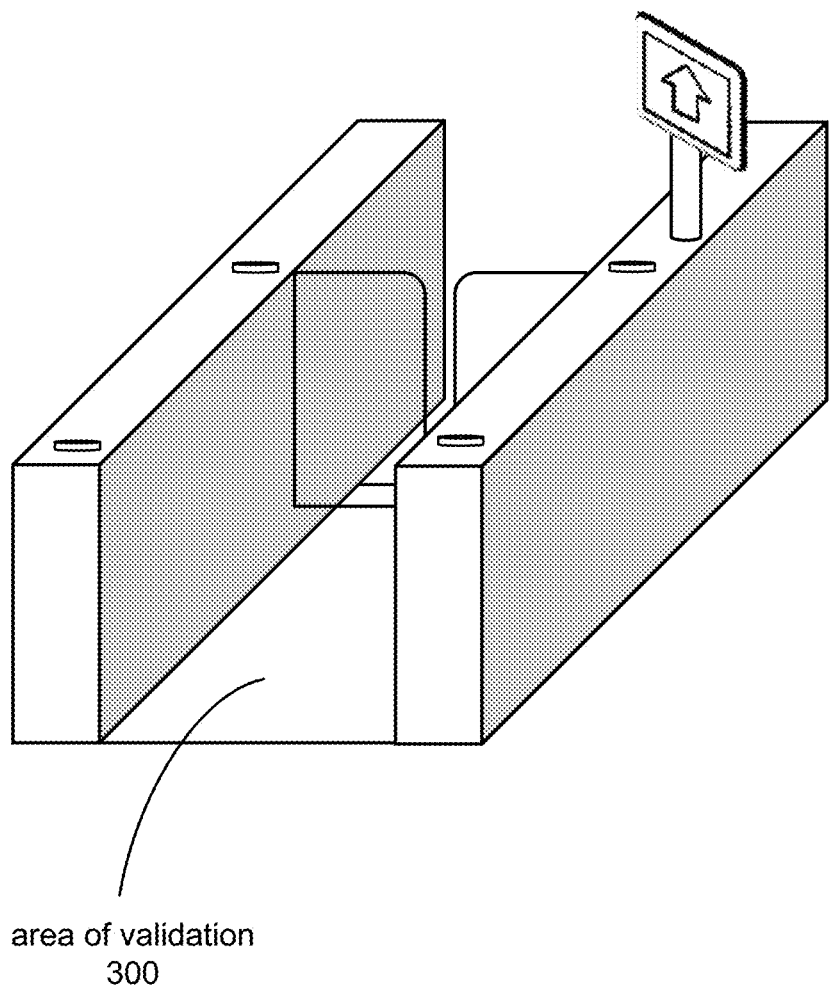
FIG. 3 illustrates an example of an area of validation for a zone computer.

FIG. 3 shows an area of validation 300 for a zone computer. For example, the area of validation is a sub-location, such as one of the lanes 110. A zone computer for the lane may determine whether a mobile device has entered the area of validation, which may be based on triangulation or other techniques. If the zone computer determines the mobile device is in the area of validation, the mobile device is validated to allow entry into the restricted area through the lane and gate. A secure communication channel is established for message exchange between the mobile device and the zone computer to facilitate validation, as is further described below.

Figure 4:
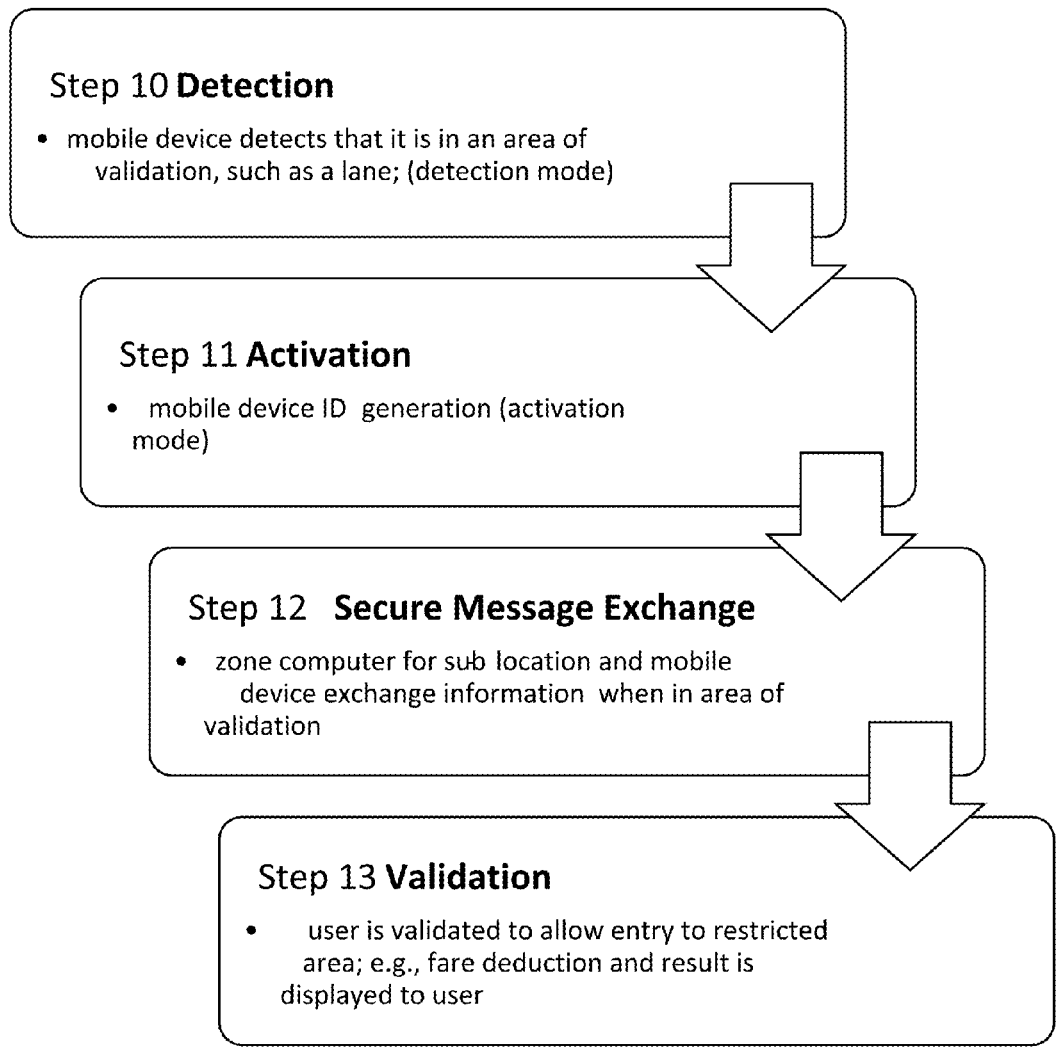
FIG. 4 shows a high-level flow chart of a method performed by the secure short-distance-based communication and access control system, according to an example of the present disclosure.
Figure 5:
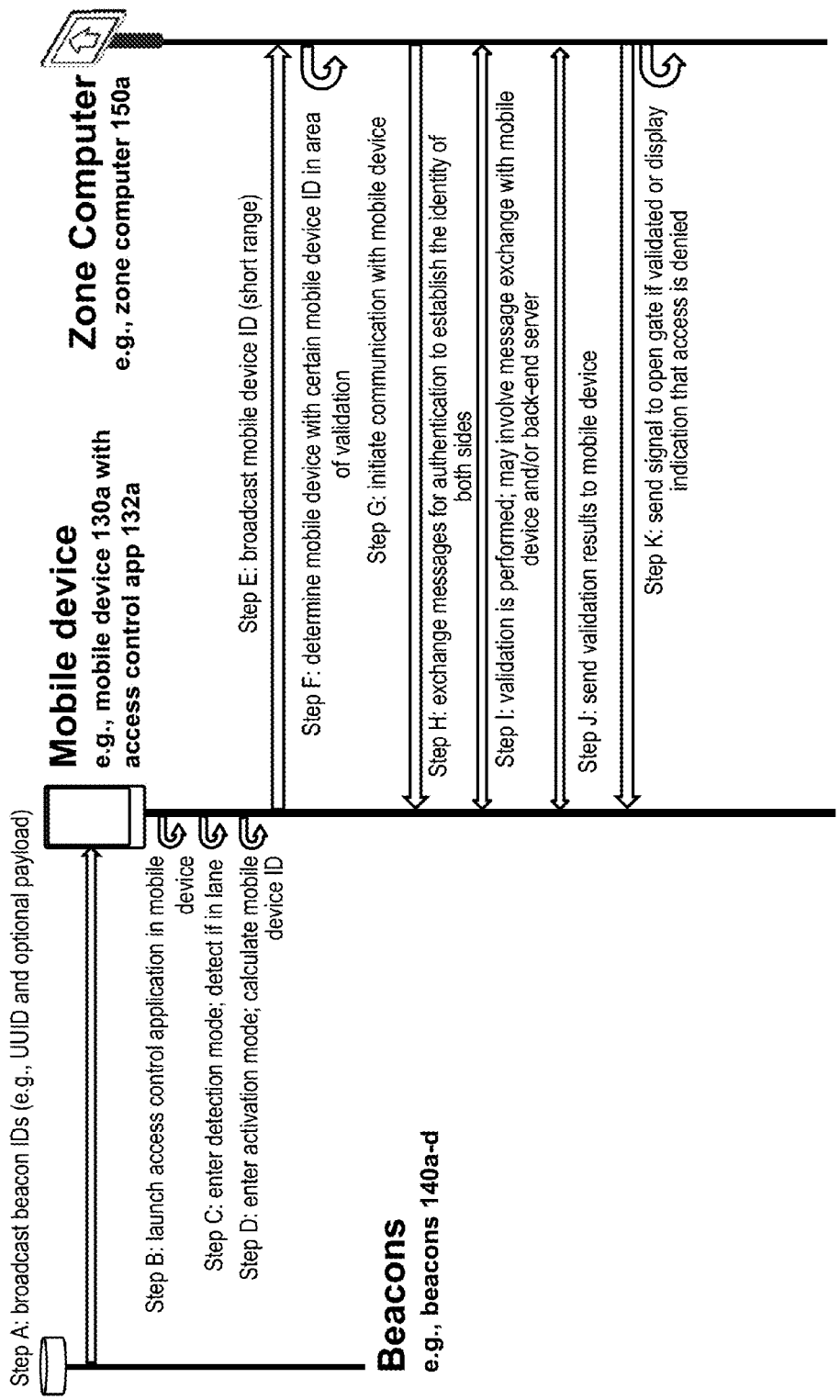
FIG. 5 shows additional details of the steps of FIG. 4, according to an example of the present disclosure.

FIG. 4 shows a high-level flow chart of steps performed by the system 100, and FIG. 5 shows additional details of the steps and the interaction between the various sub-systems of the system 100, including the mobile devices 130, beacons 140, and zone computers 150 that perform the steps according to an embodiment. Referring to FIG. 4, steps are shown for detection at step 10, activation at step 11, exchange at step 12 and validation at step 13.

At step 10, for detection, a mobile device determines whether it is in an area of validation (e.g. proximity to a zone computer for fare payment in a transit system) based on information received from beacons. Determining proximity to a zone computer (e.g., determining whether the mobile device is in the area of validation) may include determining whether the mobile device is within a valid distance to a beacon or a plurality of beacons associated with a zone computer, or determining whether the mobile device is in a sub-location in the entrance area, such as a lane, or an area of validation associated with a zone computer. For example, mobile device 130a shown in FIG. 2 receives a unique ID, e.g., including UUID, major ID and minor ID, from at least one of the beacons 140a-d when in range of the beacons 140a-d. The unique IDs of each beacons may be determined so that it can be used to identify its location, such as station, entrance location and/or lane number. The beacons may also transmit a small payload containing the location information or any other information that can help to calculate the location information.

In one example, triangulation-based detection is performed to determine whether the mobile device 130a is in a lane. For example, the access control application 132a running on the mobile device 130a registers for beacon notifications with a specific unique ID or IDs or part of the IDs, e.g. UUID and/or major ID and/or minor ID or a list of UUIDs and/or major IDs and/or minor IDs. For example, the UUIDs or the major IDs may be the same for all beacons provided by the same entity, such as all beacons for the same mass transit company or all beacons for the same rail station. So, for example, the major IDs in unique IDs broadcasted by the beacons 140 may be the same because they are for the same entity, rail station and/or entrance. The access control application 132a stores a list of UUIDs, major IDs and minor IDs that it may respond to. The mobile device 130a listens for broadcasted unique IDs from beacons. If the unique IDs of the beacon signals that are received are registered, such as stored in the list, the access control application 132a determines whether the mobile device is in an area of validation for a local computer, such as lane 110a. For example, in response to recognizing broadcasts from beacons 140a-d or at least two of the beacons, using algorithms like triangulation, the access control application 132a determines that it is within a predetermined distance (e.g., within 1 meter) to at least 2 of the beacons 140a-d. Thus, the access control application 132a determines that it is in a lane, such as lane 110a, and then proceeds to activation at step 111.

In another example, tap-based detection is performed. For example, the user lightly taps the mobile device 130a on or near beacons 140a or at zone computer 150a if it also acts as a beacon. The range of the beacon may be tuned so that the mobile device 130a needs to be in close proximity to detect the beacon, such as within 3-4 centimeters, or the mobile device might take into consideration the signal strength, zone, accuracy and other factors of the beacon broadcast to determine the proximity with the beacons, and decide accordingly. If a beacon unique ID or IDs are received that are registered at the mobile device 130a, in response to the tapping or placement in close proximity to the beacon, the access control application 132a performs activation at step 11. In another example, an intent of the user to enter validation is determined for example based on measurable user actions performed on the mobile device, such as shaking the mobile device twice, audible command spoken into the mobile device, etc.

At step 11 shown in FIG. 4, during activation, a unique run-time ID or a set of unique run-time IDs are calculated for the mobile device 132a for future secure message exchange with the zone computer 150a, and a peripheral mode is activated on the mobile device. The mobile device advertises certain service or characteristics or both using the unique ID or IDs calculated above. The peripheral mode is entered to communicate with the zone computer associated with the current location of the mobile device 132a, which is zone computer 150a. Unique ID determination may vary depending on how detection was performed. For example, if triangulation-based detection was performed, the unique IDs (like major ID, minor ID and optional payload) from the beacons used for triangulation may be used to calculate the unique ID or IDs for the mobile device. If tap-based detection was performed, the unique ID or IDs may be calculated using the unique ID or IDs from the beacon that was tapped (e.g. major ID, minor ID and optional payload from the beacon that was tapped). The peripheral mode is enabled in the mobile device to communicate with the zone computer for the lane using the unique IDs for the services and/or characteristics. Examples of unique ID calculation functions are described below.

In one example, the unique ID or IDs for the mobile device (which may be used to determine the services, such as fare payment, and/or characteristics of the access control application and the mobile device) are calculated using the information received from the beacons and/or zone computer as the input. Thus, the unique ID or IDs are specific to the current location of the mobile device. The unique ID or IDs are not valid (or may not be valid) at a different location.

A unique ID calculation function may be used to calculate the unique ID or IDs for the mobile device from the information received from one or more beacons. An example of a unique ID calculation function is described below. Assume the following: Row=Minor ID/1000; Sequence=Minor ID %1000, whereby % represents the modulo operator; Location=Major ID/1000; and Sub-Location=Major ID %1000.

If triangulation-based detection was used at step 10, the following steps may be performed to calculate the unique ID or IDs for the mobile device. The detected beacons are sorted based on the signal strength (like RSSI, transmission power, received power, etc.) in descending order. Beacons may be filtered, e.g., removed from the list, if their received signal strength indicator does not fall within a predetermined value, or if they proximity is unknown or if the azimuth and angle doesn't meet predetermined requirements or a combination of these. For example, if the signal strength is too weak, such as determined by comparing the signal strength to a predetermined threshold, the corresponding beacon may be removed from the list. Then, the top "x" beacons from the list are identified where x>1. In one example, x is greater than or equal to 3. If a plurality of beacons from the top "x" beacons have the required signal strength, then, the major ID and minor ID are used to calculate the Row, Sequence, Location and Sub-location information from the beacon signals, which is in turn is used to generate the unique ID or IDs. Beacons in the same lane may have the same location, sub location and row value.

If tap-based detection was used at step 10, then the following is performed with all the beacons that are found in range. At step 1, the beacons are sorted based on signal strength, accuracy, etc. in descending order and the first beacon in the list is identified or they are sorted in ascending order and the last beacon in the list is identified. Checks on the azimuth, angle, distance, accuracy are performed to ensure the mobile device is in the desired proximity of the beacon. At step 2, the signal strength value for this beacon should be greater than or equal to a predetermined value, e.g., <=−30 dB. At step 3, the row, location and sub-location information of the beacon is used to generate the unique ID or IDs.

One example of a unique ID calculation function for either tap-based detection or triangulation-based detection is: Unique ID=[Pre-defined Unique ID Part]+[Location]+[Sub location]+[Row]. In other examples, mathematical functions, such as a conventional hash function, RSA, etc., are employed that use these three values along with other values, to derive the unique ID or IDs. In other examples, mathematical functions can be used to determine these three values, which in turn become input to other mathematical functions to derive the unique ID or IDs. The input values may include current time, location, sub-location, row, sequence, etc.

At step 12 shown in FIG. 4, for message exchange, the mobile device and the zone computer at the sub-location, such as the zone computer for the lane, exchange information for validation. Regardless of the way detection and activation were performed, message exchange occurs in the same way. The zone computer determines whether the mobile device is within its area of validation if the mobile device is within range. FIG. 3 shows an example of an area of validation for a zone computer. To determine whether the mobile device is within the zone computer's area of validation, the zone computer may use the distance, signal strength, the azimuth and angle of the mobile device relative to the zone computer or plurality of these options to determine the mobile device's location.

The zone computer initiates a connection with the access control application on the mobile device if the mobile device is in the area of validation and the mobile device is broadcasting or advertising or transmitting one or more unique IDs and/or has predetermined services and/or characteristics. Then message exchange may occur for validation. For example, the zone computer and the access control application on the mobile device may perform a mutual authentication to establish the identity of both sides. After authentication, data is exchanged between the access control application and the zone computer for validation. The zone computer and the access control application may request additional data resulting in multiple exchanges. In another example, the mobile device may initiate the connection with the zone computer and then engage in authentication and then validation. Authentication in either case may include determination of keys for secure communication.

At step 13 shown in FIG. 4, validation is performed. Validation may be performed the same way regardless of how detection was performed. For example, the zone computer makes a decision on whether the user is validated based on data exchanged with the mobile device, equipment operational data, and/or real-time services hosted on a backend. The equipment operational data may include fare rules (different fare types, concession types, fare validity window, etc.), transfer rules, location information (e.g., zone computer location), user ID information which may be compared to a user list to determine whether the user should be blocked from entry, etc. The real-time services may include fare payment to enter or exit the restricted area 101. In another example, the backend may store authorization information for individuals to determine whether the user is cleared to enter the restricted area 101. The decision of whether the user is validated is communicated to the user, such as through a display, such as display 151a shown in FIG. 2, or through the mobile device, or through an audio notification from the zone computer and/or mobile device, or a haptic feedback (vibration) on the mobile device. For example, the zone computer may send information to the access control application related to the validation decision and/or the user's account (e.g., new balance, transaction summary, etc.). The access control application may communicate the decision to the user using inbuilt features like haptic feedback, audio notification, visual notification, etc., based on user's preferences. Also, the gate is opened if the user is validated to allow entry or exit. Or in a case of an always open gate, the gate is closed if the user is denied entry or exit.

FIG. 5 shows details of the steps of FIG. 4 and illustrates the interaction between the devices in the system 100 performing the steps. For example, assume user 131a is entering lane 110a and has mobile device 130a running access control application 132a, such as shown in FIGS. 1 and 2. The mobile device 130a interacts with beacons 140a-d and zone computer 150a when performing the steps.

The beacons 140a-d periodically broadcast their unique IDs and optional payload indicating location. At step A, the mobile device 130a receives the broadcasts when in range. At step B, if the access control application 132a isn't already running, the access control application 132a is launched for example if the operating system of the mobile device 130a recognizes the unique IDs of the beacons as registered unique IDs. For example, beacon IDs that have a predetermined UUID, major ID and/or minor ID invoke launching of the access control application 132a. If tap based detection is used for the beacons, the access control application 132a may be launched if the user taps on or near a beacon and the unique IDs of the beacon is registered. At step C, the access control application 132a enters detection mode to determine whether it is in a lane, such as lane 110a. Detection may include tap-based detection or triangulation-based detection. After detecting the mobile device 130a is in lane 110a, the access control application 132a enters activation mode to calculate the unique ID or IDs based on information from the beacons and a message with the unique ID or IDs may be broadcasted or sent to a local zone computer, e.g., zone computer 150a, at step E. For example, a mobile device unique ID, which includes the calculated unique ID or IDs, is broadcasted by the mobile device 130a. The broadcast may be a short range broadcast, such as using BLE, Bluetooth 4.0.

At step F, the zone computer 150a receives the broadcasted message with the mobile device unique ID from the mobile device 130a assuming it is within range, the zone computer 150a validates that the broadcasted message contains the unique ID or IDs related to the sub-location and determines whether the mobile device 130a is within the area of validation of the zone computer 150a. An example of the area of validation is shown in FIG. 3, such as the lane 110a. The zone computer 150a uses the distance, signal strength and optionally the azimuth and angle of the mobile device 130a, which may be determined from the received message, to determine whether the mobile device 130a is in its area of validation. For example, in addition to receiving the message from the mobile device 130a, the zone computer 150a may receive a message from a mobile device around the lane 110b. However, the zone computer 150a determines that only the mobile device 130a is currently in its area of validation, i.e., lane 110a or has the correct unique ID or IDs. Accordingly, the zone computer 150a will only communicate with the mobile device 130a for validation at this instant.

At step G, if the mobile device 130a is determined to be in lane 110a, the zone computer 150a initiates communication with the mobile device 130a using the unique ID or IDs as a reference. For example, the zone computer 150a sends an acknowledgment message to the mobile device 130a that includes the mobile device unique ID so the mobile device 130a knows that the zone computer is ready to proceed to validation. In another example, the zone computer 150a may broadcast or transmit an acknowledgment message that is encrypted with a key to the mobile device 130a. Only the mobile device 130a can decrypt the acknowledgment message sent from the zone computer 150a because no other mobile device knows the key. In yet another example, the zone computer 150a and the mobile device 130a calculate the mobile device unique ID independently using the same inputs and the same function. For example, the inputs for the unique ID calculation function described above may be determined by the mobile device 130a and broadcasted or sent to the zone computer 150a with the mobile device unique ID. Both the zone computer 150a and the mobile device 130a store the same function for calculating the mobile device unique ID. The zone computer 150a also calculates the mobile device unique ID. The zone computer 150a determines if the received mobile device ID matches the calculated mobile device ID to determine whether to continue with the process, e.g., initiate communication, authentication and validation.

Mutual authentication is performed at step H. The mobile device 130a and the zone computer 150a may exchange messages for authentication to establish identities of both sides. The mutual authentication might result in a generation of a key or set of keys that are then used for further encryption, decryption, enciphering, deciphering, etc. A conventional key encryption algorithm may be used.

At step I, the zone computer 150a determines whether the mobile device 130a or its user 131a is validated. Validation may include exchanging messages with a backend server not shown and/or the mobile device 130a to get the information needed to perform validation. In one example, validation may include a fare payment determination and the zone computer 150a may determine whether the fare can be paid from a user account for the user 131a. At step J, validation results are returned to the mobile device 130a. At step K, the zone computer 150a sends a signal to open gate 160a for the lane 110a if the user 131a is validated. The signal may be an internal signal if the gate 160a is part of the system 100 or it may be transmitted to an external system if the gate 160a is part of an external system. If the validation is denied, the zone computer 150a can display an indication on the display 151a that access to the restricted area is denied. If the user 131a is validated, the zone computer 150a can display an indication on the display 151a that the they are approved to access (or exit) the restricted area.

After steps E and F are performed, keys may be used for secure communication. As described above, the keys may be used to encrypt or encipher the messages between the mobile device 130a and the zone computer 150a. Accordingly, the key may be used for secure communication between the mobile device 130a and the zone computer 150a. Also, the mobile device unique ID and/or the key are run-time. For example, they may be generated in real-time for the validation process and are only valid for the current time and location and for the particular mobile device. This provides additional security by improving the robustness of the key. In another example, MACing might be used to secure the communication between the mobile device 130a and the zone computer 150a. In another example, both encryption and MACing might be used to secure the communication between the mobile device 130a and the zone computer 150a.

At step I, validation may vary depending on whether information for validation is stored locally or stored in a backend server. For example, for a "stored value" system, information for validation is stored locally on the mobile device in a secure manner. For example, information, such as user profile, balance amount, passes and concession information are stored securely on the mobile device. In a "credential" systems, the information is stored on a backend server (e.g., the cloud), and the mobile device only stores credentials, such as user account number, and the information is retrieved from the backend server in real time for completing validation or enforcement of transactions.

The information for validation, whether a "stored value" or a "credential" system is being used, can be encrypted and stored within a local data storage in the mobile device. In one example, the mobile device may not have the encryption key to decrypt the information and only the zone computer or computers may have access to the encryption key (or keys) to decrypt the data. Additionally, the encryption key may be derived by the zone computer or a secure storage (like a secure access module (SAM) or hardware security module (HSM) or a secure element running applets, connected to the zone computer) using the user's information as one of the inputs. Also, the encryption keys with which the data is encrypted and passed encrypted to the mobile device may be changed every time the user tries to access a restricted area to prevent tampering with the data. The mobile device does not have access to the key which protects the data.

The information related to user's account may be stored inside a secure storage area inside the mobile device (like a secure element, a secure element micro secure digital card, a universal integrated circuit card, a secure area within the application processor, etc.). This may involve an additional authentication performed between the zone computer and the secure storage, establishing the identity of both sides, resulting which the information is shared by the secure storage with the zone computer via the validator mobile application.

Also, one or more keys may be used to encrypt the communication between the secure storage and the zone computer. Additional keys may be generated during mutual authentication, which are then be used for encryption for the current session only.

In another example, the information related to user's account is stored in the backend server and can be securely accessed and updated by either the mobile device or by the zone computers or both. The mobile device only stores the user's credentials which may be a user ID, account number, or a similar unique identifier which can be used to access the user's information from the backend server in real time.

Figure 6:
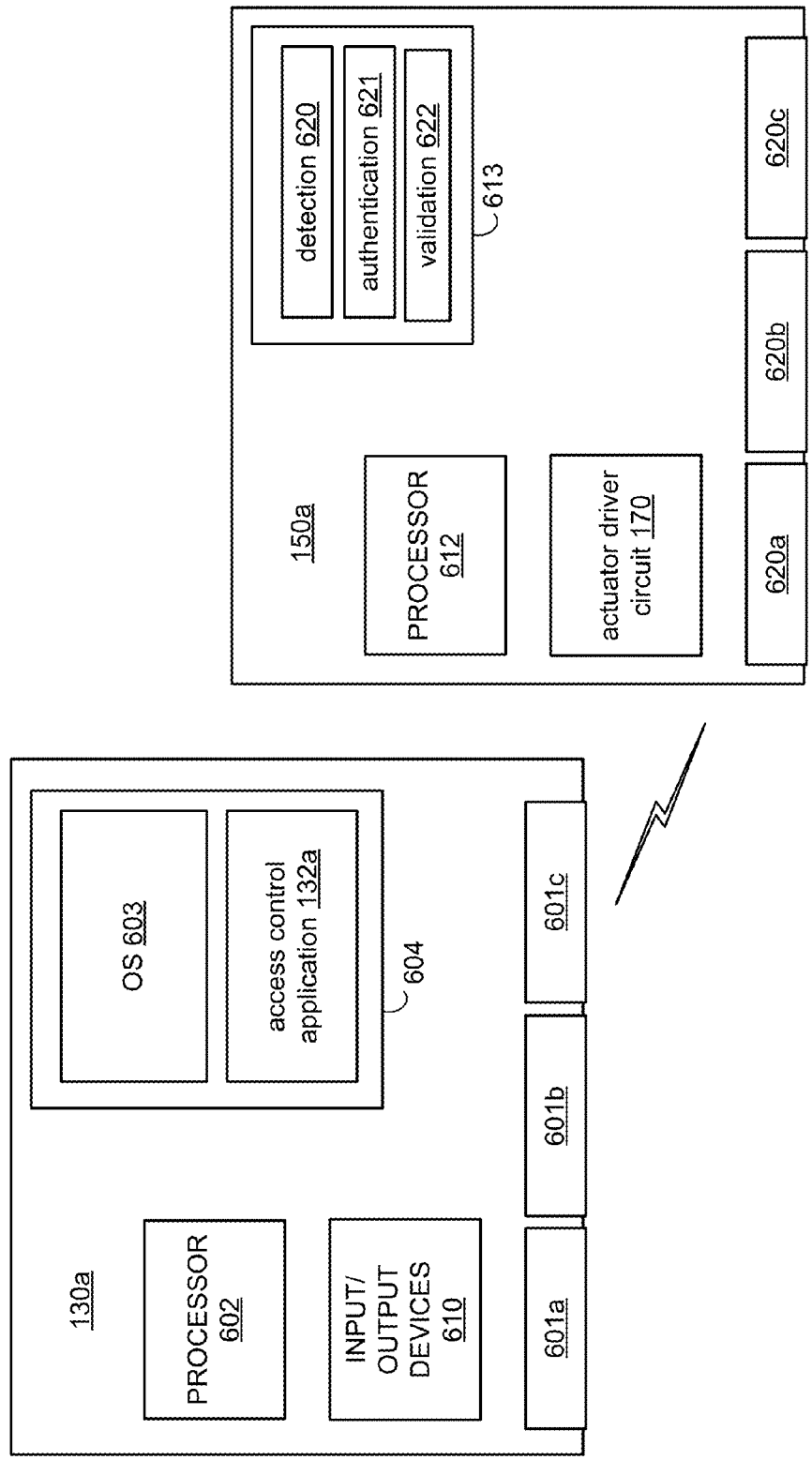
FIG. 6 illustrates a block diagram of the secure short-distance-based communication and access control system, according to an example of the present disclosure.

FIG. 6 shows a block diagram of the mobile device 130a and the zone computer 150a in the system 100 but is representative of any of the mobile devices and the zone computers that may be used in the system 100.

The mobile device 130a may include multiple interfaces 601, wired or wireless, for communicating with other devices. For example, interface 601a may be a Wi-Fi interface or a cellular interface or may include both interfaces. 601b may include a Bluetooth interface. In one example, message exchanges between the mobile device 130a and the zone computer 150a are done through Bluetooth or Bluetooth 4.0 or BLE or future versions of Bluetooth but other interfaces may be used. Interface 601c may be a NFC interface, but the mobile device 130a may have both Bluetooth and NFC interfaces and multiple other interfaces. Interface 601b may be for communicating with the beacons 140, for example, for triangulation-based or tap-based detection.

The mobile device 130a includes a processor 602 and data storage 604. The processor 602 for example is an integrated circuit. The processor 602 may be a chipset with central processing unit and/or custom processing circuits, such as an application-specific integrated circuit (ASIC) or field-programmable gate array (FPGA). The processor 602 may run an operating system (OS) 603 and applications, including access control application 132a, for the mobile device 130a. The OS 603 and the applications are stored in data storage 604. The mobile device 130a includes input/output (I/O) devices 610, such as keyboard, touch screen display, speaker, etc. The I/O devices 610 may provide audio, visual and/or tactile output to indicate whether a user has been validated and allowed access to the restricted area 101 or whether the user is denied access.

The zone computer 150a includes a processor 612 and a data storage 613. The processor 612 is an integrated circuit. The processor 612 may execute software or firmware or comprise custom processing circuits, such as an application-specific integrated circuit (ASIC) or field-programmable gate array (FPGA). The data storage includes software or firmware including machine readable instructions. The software or firmware may include subroutines or applications for detection 620, authentication 621 and validation 622. The detection 620 includes determining when a mobile device is in the area of validation for the zone computer 150. Authentication 621 and validation 622 are described above and are for authenticating the mobile device 130a before communicating with it and validating the mobile device 130a to allow or deny access to the restricted area 101. The zone computer 150a may include I/O devices or be connected to an I/O device, such as display 151a, to provide indication to the user of whether they are validated.

The zone computer 150a also includes multiple interfaces 620, wired or wireless, for communicating with other devices. For example, interface 620a may be a Wi-Fi interface or a cellular interface or may include both interfaces. 620b may include a Bluetooth or Bluetooth 4.0 or BLE interface. In one example, message exchanges between the mobile device 130a and the zone computer 150a are done through a Bluetooth but other interfaces may be used. 620c may be a NFC interface, but the mobile device 130a may have both BLE and NFC interfaces. The interfaces 620b and 620c are short-distance communication interfaces. A short-distance communication interface may have a communication range of few meters (e.g., Bluetooth or BLE) or centimeters (e.g., NFC). The range is generally much shorter than Wi-Fi or cellular. The short-distance communication interface may cover a sub-location or a sub-location and its adjacent sub-location. The zone computer 150a may connect via a network interface of interfaces 620 to a server backend via the Internet or another wide area network or a local area network for validation, which may include fare payment.

The zone computer 150a may include an actuator driver circuit 170 to control actuation of the physical barrier for the sub-location of the zone computer. In response to determining the user is validated, the zone computer 150a sends a signal to the actuator driver circuit 170 to invoke opening of the physical barrier, such as gate 160a, for the sub-location, such as lane 110a, of the zone computer 150a. For example, the processor 612 validates a user associated with the mobile device 130a and sends a signal to the actuator driver circuit 170. The actuator driver circuit 170 drives an actuator of the gate 160a to open the gate 160a. The processor 612 may also drive the circuit 170 to close the gate 160a. In one example, the global positioning system (GPS) sensor on the mobile device may be used to determine when the user enters and exits the mass transit system in order to determine the fare amount and open the gate 160a if the fare is paid when the user is exiting.

Figure 7:
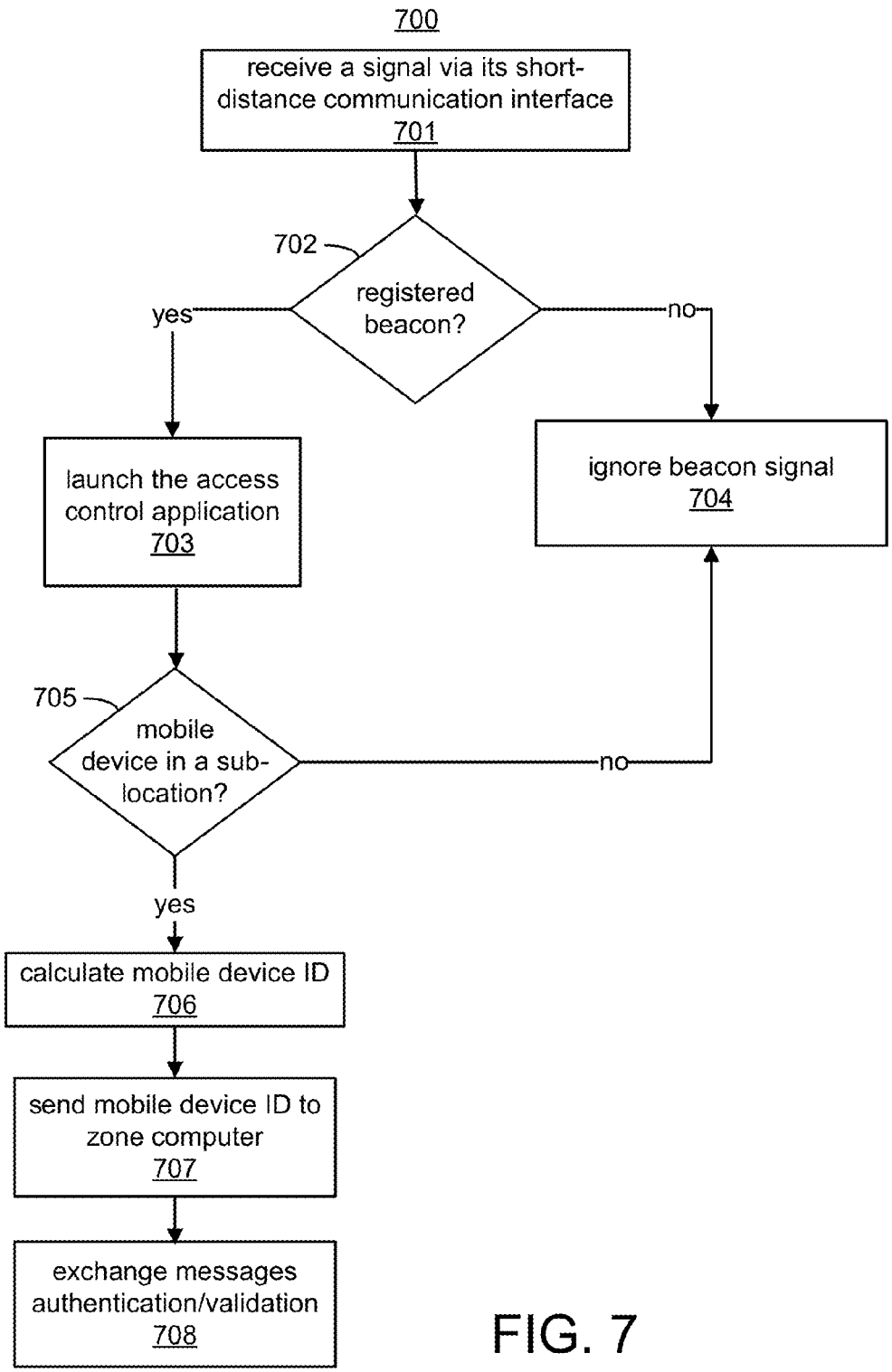
FIGS. 7 and 8 illustrate flowcharts of methods performed by a mobile device and zone computer in the secure short-distance-based communication and access control system, according to examples of the present disclosure.

FIG. 7 shows a flowchart of a method 700 that may be performed by a mobile device, such as the mobile device 130a, in the system 100. At 701, the mobile device 130a receives a signal via its short-distance communication interface, such as a Bluetooth, BLE or Bluetooth 4.0, interface. At 702, the mobile device 130a determines whether it is from at least one registered beacon. For example, the OS 603 running on the mobile device 130a determines whether the unique IDs, like UUID, major ID and/or minor ID received from a beacon or a plurality of beacons matches one or more registered unique IDs. At 703, if the beacon or beacons are registered beacons, the OS 603 launches the access control application 132a. If not, the received signals are ignored at 704.

At 705, the access control application 132a determines whether the mobile device 130a is in a sub-location, e.g., lane 110a, of the access control area 102. This may be determined by triangulation-based detection or tap-based detection as described above. If the mobile device 130a is determined to be in a sub-location, a mobile device ID is calculated based on information received from the one or more beacons at 706. The mobile device ID may be unique to the current location of the mobile device 130a when the mobile device ID is calculated and subsequently broadcasted in a message, which may be received by the zone computer 150a at 707 assuming it is within range. If the mobile device 130a is not determined to be in a sub-location, the signals from the beacons are ignored at 704. At 708, messages are exchanged with the zone computer 150a for the sub-location in a secure manner using one or more encryption keys via a short-distance communication interface (e.g., Bluetooth) to mutually authenticate each other and validate a user associated with the mobile device and to allow access to the restricted area through the sub-location if the user is validated.

Figure 8:
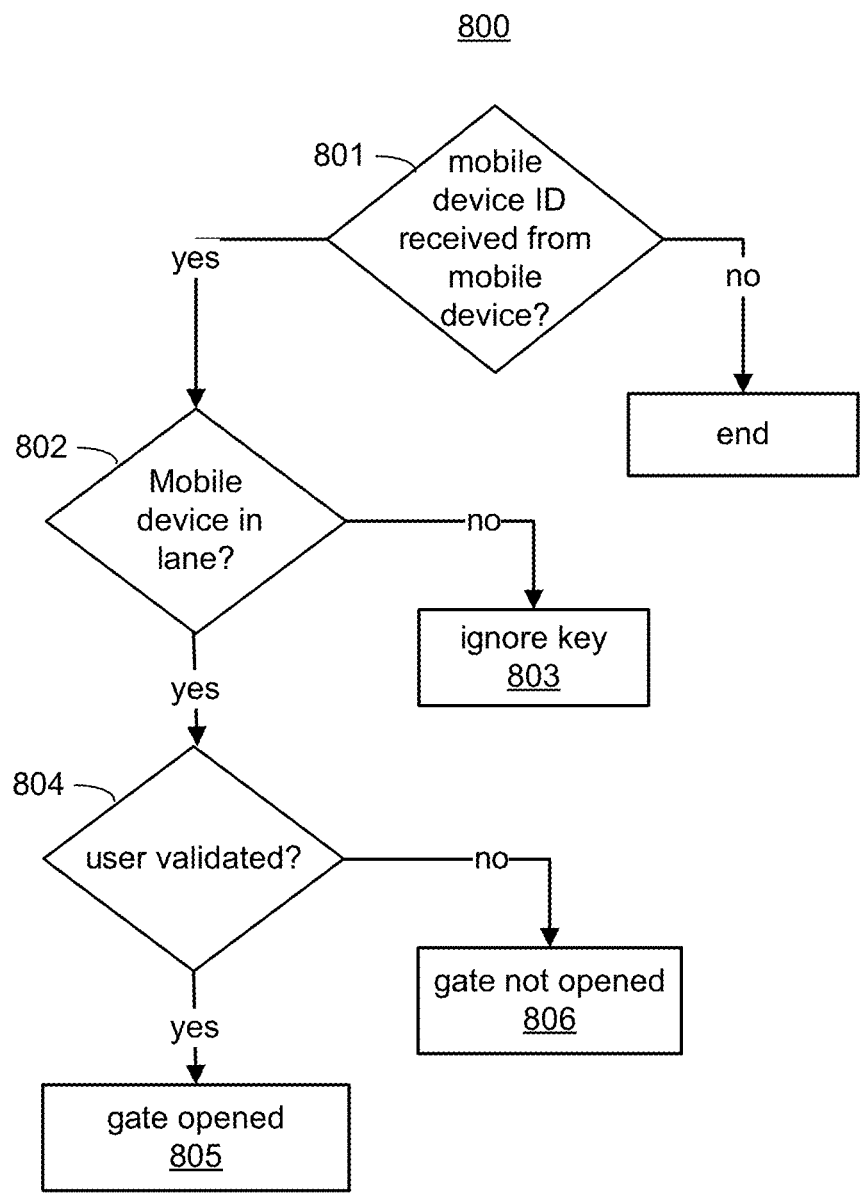

FIG. 8 shows a flowchart of a method 800 that may be performed by a zone computer, such as the zone computer 150a, in the system 100. At 801, the zone computer 150a determines whether a mobile device ID is received in a message from the mobile device 130a via a short-distance communication interface of the zone computer 150a. If the mobile device ID is received, the zone computer 150a determines whether the mobile device 130a is in lane 110a at 802. If tap-based detection was used, the zone computer 150a can determine the proximity of the user to the lane 110a. Alternatively, the zone computer 150a may scan for all Bluetooth mobile devices in range looking for devices which expose certain services/characteristics, and determines a mobile device is in the lane 110a based on the signal strength, dwell time, accuracy, distance, azimuth, angle, etc.

At 803, if the mobile device 130a is not determined to be in lane 110a, the message is ignored. If the mobile device 130a is determined to be in lane 110a, the zone computer 150a determines whether a user associated with the mobile device 130a is validated to access the restricted area at 804. At 805, the zone computer 150a for example opens the gate 160a for lane 110a, and sends a message to the mobile device 130a that the user is validated if the user is determined to be validated. Otherwise, at 806, the gate 160a is not open and a message is sent indicating validation failure. Validation results may also be displayed on display 151a.

Figure 9:
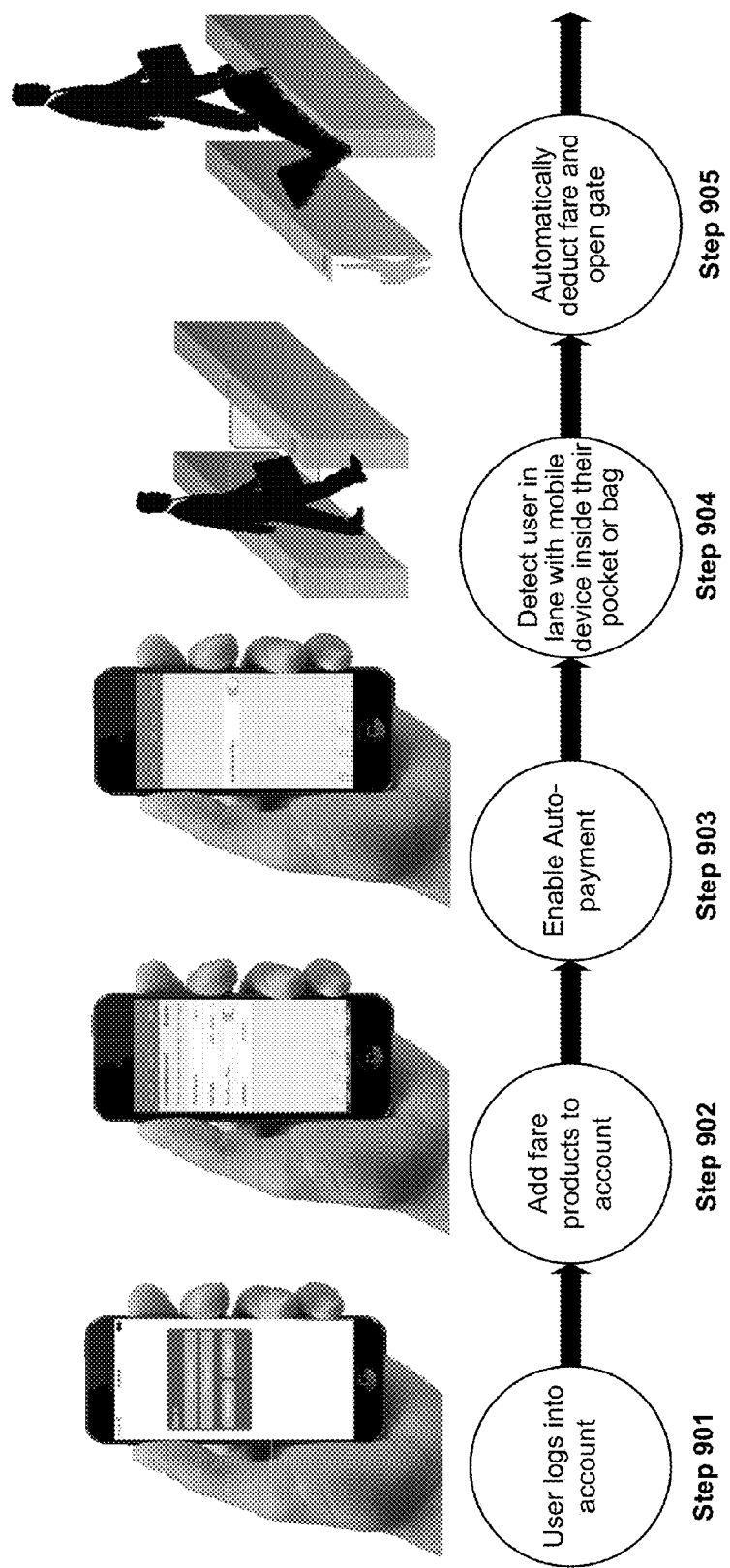
FIG. 9 illustrates a method for fare-based validation, according to an example of the present disclosure.

FIG. 9 illustrates a method 900 for fare-based access control using the system 100. For example, validation and approval or denying entry or exit to a restricted area is based fare payment. The restricted area 101 for example provides a fare-based service, such as a subway or rail station that charges a fare to passengers that ride the train. Also, the access control application 132a includes modules to enable fare payment.

At 901, a user logs into their account. The user may have to create an account if they don't have one. The access control application 132a provides a graphical user interface on the mobile device 130a to receive a login ID and password and send the information to a backend server to log the user into their account. At 902, the access control application 132a adds fare products to the account based on user selections. Fare products includes any goods or services for which the user is authorizing payment. At 903, the access control application 132a enables auto-payment of the selected fare products in response to user input. At 904, the mobile device is detected in a fare-gate lane, such as lane 110a. Detection of the mobile device 130a in lane 110a to invoke validation is described in detail above. Validation is the payment of the fare in this example. The mobile device 130a may remain in the user's pocket or bag to invoke validation, which is more convenient for the user. At 905, the user's account is automatically deducted and the fare gate opens. The amount deducted is based on the fare scheme used by the transit entity, which may be based on distance, day pass, etc.

The methods shown in FIGS. 4 and 5 generally describe a mobile device communicating with a zone computer to validate a user. Examples are also described whereby the zone computer and/or the mobile device communicate with a backend server, which may be in a cloud. For example, in a "credential" system, the validation information is stored on a backend server (e.g., on the cloud), and the mobile device stores the user's credentials, such as user account number, password, etc. The user's credentials may be provided to the backend server for completing validation or enforcement of transactions in real-time.

According to another example of the present disclosure, validation is performed without the zone computer. For example, the mobile device communicates directly with the backend server to perform validation. The system 100 shown in FIGS. 1-3 may be used in this example, except the zone computers 150 are excluded from the system 100, or one or more of the zone computers 150 remain in the system 100 but may be bypassed to validate a user. Excluding the zone computers 150 saves costs for the system 100 and can reduce latency by eliminating steps for message exchange between a mobile device and zone computer and message exchange between the zone computer and backend server.

Figure 10:
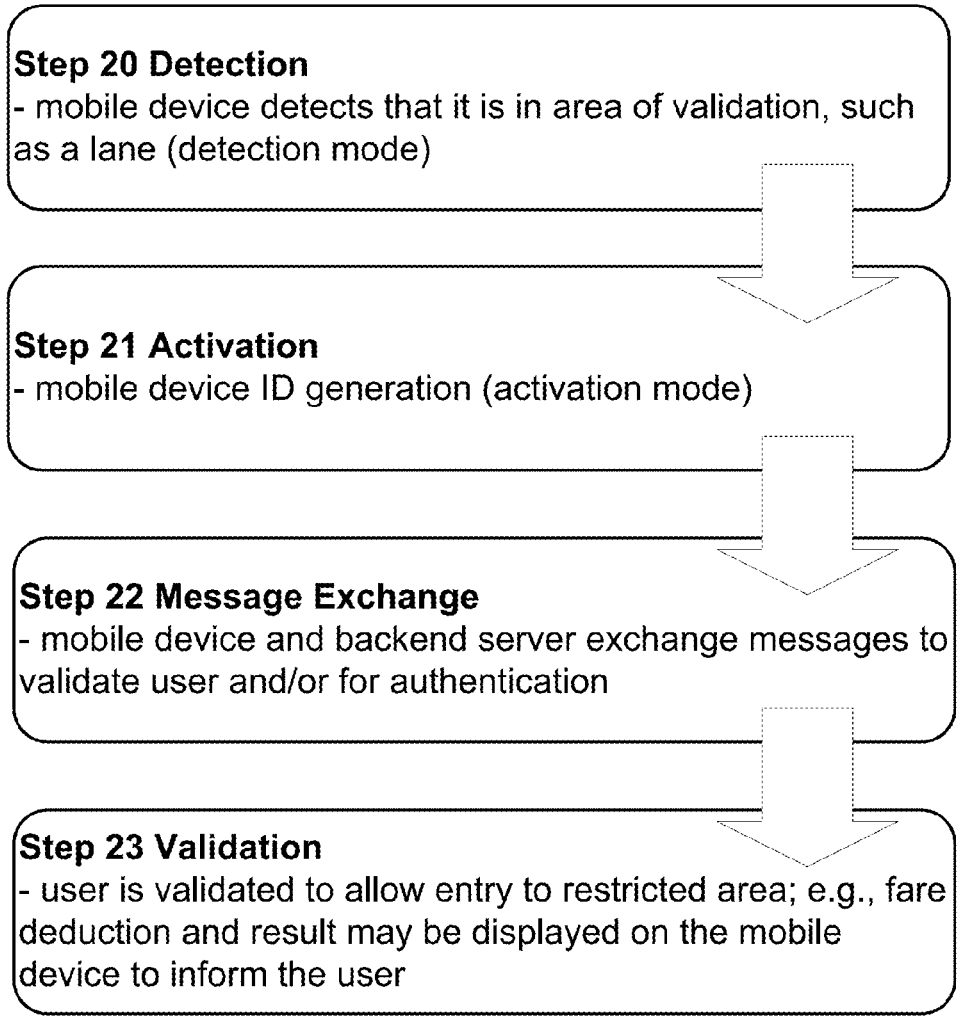
FIG. 10 illustrates a method for validation, according to an example of the present disclosure.

FIG. 10 shows a method, similar to the method shown in FIG. 4, except the message exchange is performed between the mobile device and the backend server instead of between the mobile device and the zone computer. Referring to FIG. 4, steps are shown for detection at step 10, activation at step 11, exchange at step 12 and validation at step 13. Similarly, steps are shown in FIG. 10 for detection at step 20, activation at step 21, exchange at step 22 and validation at step 23. Similar to step 10 of FIG. 4, at step 20 of FIG. 10, for detection, a mobile device determines whether it is in an area of validation based on information received from beacons. However, at step 20, the mobile device is not determining whether it is in proximity to a zone computer, but instead determines whether it is in a predetermined sub-location of an access area of the restricted area, such as one of the lanes 110. Detection techniques discussed with respect to step 10 are applicable to step 20. For example, the mobile device 130a enters lane 110a, as shown in FIGS. 1 and 2, and detects through triangulation or tap-based detection that it is in lane 110a. The access control application 132a for example enters detection mode in response to receiving a beacon signal to detect it is in lane 110a. The mobile device for example evaluates the proximity of beacons, performs a triangulation, and perform activations (step 21) if the mobile device determines it is in a predetermined sub-location of the access area based on the triangulation.

After the mobile device 130a detects it is in a sub-location of the access area (e.g., area of validation 300 or lane 110a), activation is performed at step 21. For example, the access control application 132a enters activation mode to calculate the unique ID or IDs based on information from the beacons, and a message with the unique ID or IDs may be sent to the backend server for validation at step 22. Examples of calculating the unique ID or IDs are described above with respect to FIGS. 4 and 5.

The message exchange of the step 22 may include the mobile device 130a and the backend server exchanging information for validation. For example, the backend server determines whether a mobile device unique ID is received from the mobile device 130a and determines whether the mobile device 130a is in a sub-location of the access area, such as lane 110a. The backend server may receive the mobile device unique ID from the mobile device 130a and determines that the mobile device 130a is in one of the sub-locations, such as one of the lanes 110. Also, the backend server may determine the particular sub-location where the mobile device 130a is currently located, such as lane 110a, from the unique ID, or the mobile device 130a may send the particular sub-location with the message that includes the unique identifier. Also, as discussed above, the unique ID sent in the message may be used for secure message exchange, e.g., used as encryption keys, between the mobile device 130a and the backend server. In an example, the backend server may determine whether the mobile device unique ID is associated with the validation services provided by the backend server, and if so, the backend server may begin an authentication process, which may then be followed by the message exchange for validation.

Also at step 22, the mobile device 130a may send user credentials of the user 131a during the message exchange to validate the user 131a. The user credentials may include account information, password, or any information needed to validate the user 131a. Also, access control application 132a on the mobile device 130a, when accessing the backend server, may authenticate while sending the mobile device unique ID and/or other information to the backend server. In an example, authentication may be performed using an API access token. For example, OAuth, which is an open standard for authorization may be used to provide the access control application 132a with 'secure delegated access' to the backend server services. The access control application 132a may also send the authentication/user credentials along with the mobile device unique ID and/or other information to the backend server to reduce turnaround and perform authentication and validation in a single message exchange.

At step 23, the backend server performs validation of the user 131a. For example, the backend server makes a decision on whether the user 131a is validated based on data exchanged with the mobile device and data stored or available at the backend server. For example, the backend server deducts a fare from the user's account and sends a validation signal to facilitate access to the restricted area 101. In another example, the backend server communicates with a fare management system that may be hosted by another server to determine whether the user has an account for fare payment, whether the user has sufficient funds for payment, autopayment of the fare, etc. A validation signal may be sent to a fare gate actuator driver circuit of the lane 110a to open the gate 160a if the user 131a is validated. The fare gate actuator driver circuit for example is connected to a network interface to receive the validation signal from the backend server to open the gate. The validation process happens in real-time so as not to delay validated access to the restricted area. In another example, the validation signal may be sent from the backend server to the mobile device 130a, and the access control application 132a sends the validation signal to the fare gate actuator driver circuit to open the gate 160a.

By way of example, operation of the mobile device 130a is described above, but any of the mobile devices 130 located in any of the sub-locations (e.g., lanes 110) may perform the validation steps described above. The mobile device 130a may remain in the user's pocket or bag and enters into activation mode to facilitate payment at steps 20 and 21. In the activation mode, the access control application 132a may invoke fare payment by transmitting the unique ID, credential information, and sub-location information to the backend server over a network, such as the Internet. The information needed for the backend server to validate the user 131a may only be transmitted when the access control application 132a is in activation mode to minimize unauthorized access to the validation information.

After the backend server validates the user 131a and transmits the validation signal to open the gate 160a, the user 131a moves through the lane 110a into the restricted area 101. After the user 131a moves past the gate 160a, the gate 160a closes. One or more sensors may be provided at the gate 160a, e.g., motion sensors, ultrasonic sensors, video analytics, etc., that sense the user 131a passing through the gate 160a, and the gate 160a is closed in response to the sensor(s) detecting that the user 131a has passed through the gate 160a. In an example, entry beacons and exit beacons may be employed to determine whether a user has passed through the gate 160a. In another example, one or more sensors on the mobile device 130a may detect the user's motion and send a signal to the fare gate actuator driver circuit to close. For example, the mobile device 130a may estimate distance and direction traveled using output from a gyroscope, pedometer, or another suitable motion detector. In an example, the gate 160a may be opened in a special mode to allow the user 131a and another user, such as a caretaker, to pass through the gate 160a. For example, the access control application 132a sends information to the backend server during the message exchange at step 22 that indicates another user (e.g., caretaker) needs to enter the restricted area with the user 131a. For example, with the mobile device unique ID, a special request may be sent that includes a request to authenticate the user and the caretaker. This may be a special request for handicapped access. The backend server may validate the special request which may include validating both users, and sends a signal or special command to the gate 160*a* to open the gate 160*a* and allow both users to pass before closing the gate 160*a*. Validating the special request may include charging an additional fare for both users or charging a handicapped fare. The actuator driver circuit at the gate 160*a* may recognize the special command and maintain the gate 160*a* in an open position for an extended period to allow both users to pass and/or sensors at the gate 160*a* or in the mobile device 130*a* may detect two users passing through the gate 160*a* and then invoke closing the gate 160*a*.

The steps above are generally described with respect to user 110*a* moving into restricted area 101 via lane 110*a*. The steps of FIG. 10 are not limited to validating a user at a fare gate and may be performed for any validation area, including validation areas that may not have a physical barrier to control access thereto.

Figure 11:
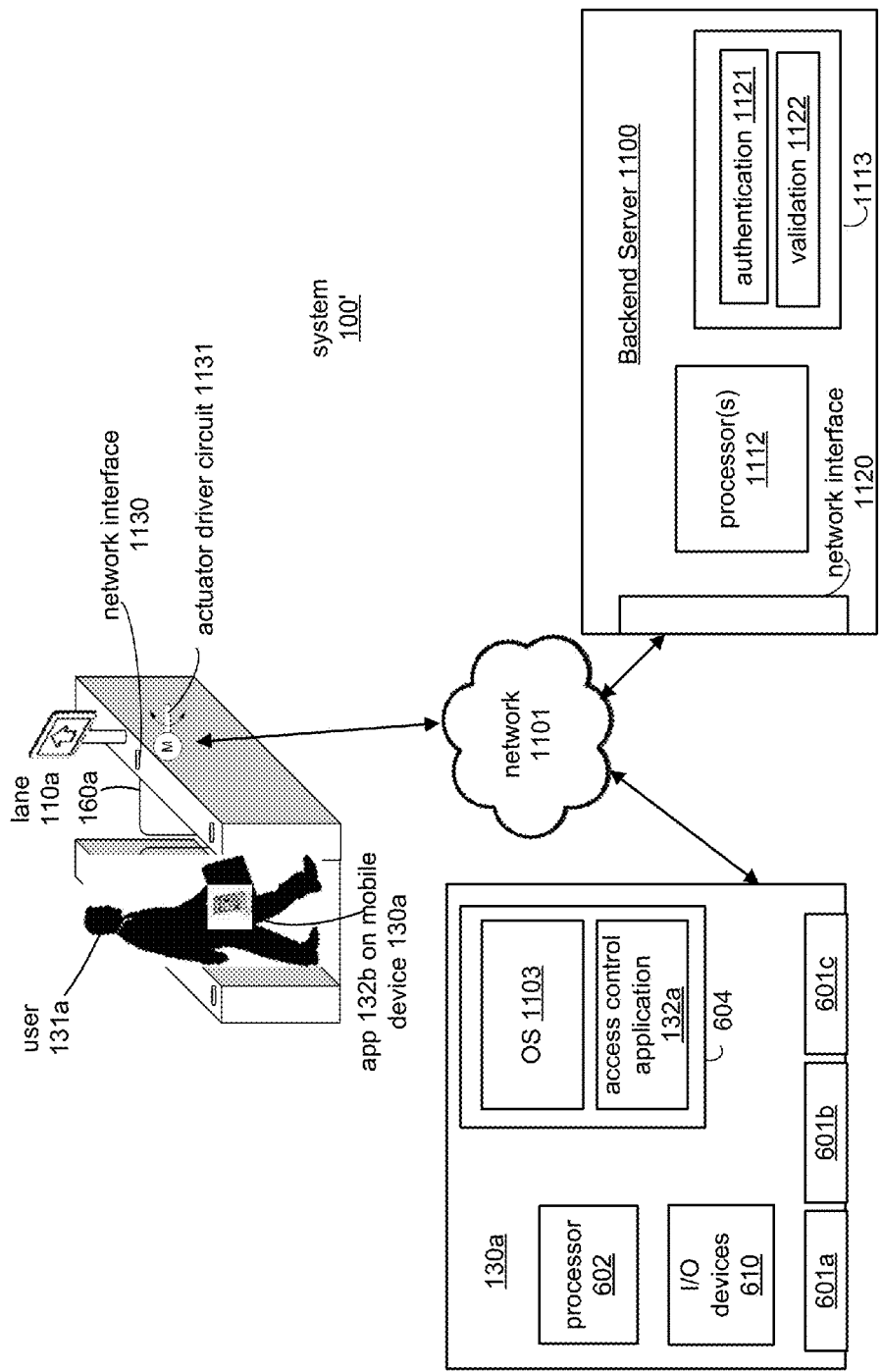
FIG. 11 illustrates a block diagram of a system, according to an example of the present disclosure.

FIG. 11 shows a block diagram of a system 100' including the mobile device 130*a* and the backend server 100. The system 100' is the same as the system 100 except the zone computers 150 may not be used. The method shown in FIG. 10 may be performed by the system 100'.

The mobile device 130*a* is described with respect to FIG. 6 and thus is not described again. The backend server 1100 may one or more processors 1112 and a data storage 1113. The processor 1112 is an integrated circuit. The processor 1112 may execute software or firmware or comprise custom processing circuits, such as an ASIC or and FPGA. The data storage 1113 includes software or firmware including machine readable instructions. The software or firmware may include subroutines or applications for authentication 1121 and validation 1122. Authentication 1121 may include authenticating the mobile device 130*a* such as described above. Also, a secure communication channel may be established between the mobile device 130*a* and the backend server 1100. Validation 1122 is described with respect to FIG. 10 and may include a message exchange with mobile device 130*a* to receive user credentials and validate the user 131*a* based on the credentials and send a validation decision back to the mobile device 130*a*, where it may be displayed on the mobile device 130*a*. Also, the backend server 1100 may send a signal to the actuator driver circuit 1131 via network interface 1130 to open the gate 160*a*. The actuator driver circuit 1131 drives an actuator of the gate 160*a* to open the gate 160*a* and may also drive the circuit 1131 to close the gate 160*a*. In one example, sensors on the mobile device 130*a* or beacons in proximity to the lane 110*a* may be used to determine when the user enters and exits the lane 110*a* to open and close the gate 160*a*. The backend server 1100 may be connected to the actuator circuit 1131 and the mobile device 130*a* via network interface 1120 and the network 1101. The network 1101 may include one or more of a local area network, wide area network, Internet, public or private networks, access network, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. An access control system to validate access to a restricted area, the system comprising:

at least one electronically-controlled movable physical barrier and respective actuator drive circuit to control actuation of the at least one electronically-controlled movable physical barrier, wherein the at least one electronically-controlled movable physical barrier is located in a sub-location of a plurality of sub-locations of an access control area associated with the restricted area;

a beacon for each sub-location, wherein each beacon broadcasts a signal in its sub-location and the broadcasted signal include a beacon identifier specific to an associated sub-location; and a server including at least one processor to:
receive a mobile device identifier from a mobile device, wherein the mobile device identifier is calculated by the mobile device based on the beacon identifier included in the broadcasted signal;

determine a proximity of the mobile device to a sub-location of the plurality of sub-locations;

determine whether the mobile device is in a sub-location of the plurality of sub-locations based on the determined proximity of the mobile device to the sub-location;

in response to a determination that the mobile device is in the sub-location, determine whether a user associated with the mobile device is validated to access the restricted area; and in response to determining the user is validated, invoke opening the physical barrier for the sub-location by sending a validation signal to at least one of the mobile device and the respective actuator driver circuit.

2. The access control system of claim 1, wherein the mobile device detects when it is in the sub-location and enters into an activation mode to send location information for the sub-location and user validation information to the server.

3. The access control system of claim 2, wherein the mobile device sends the user validation information to the server in response to a determination that the mobile device is in the activation mode.

4. The access control system of claim 1, wherein the server sends the validation signal to the mobile device to invoke opening of the physical barrier, and the mobile device sends a signal to the respective actuator driver circuit to open the physical barrier.

5. The access control system of claim 1, wherein the mobile device identifier is unique to the sub-location when compared to identifiers for other sub-locations of the plurality of sub-locations.

6. The access control system of claim 1, wherein the at least one processor uses one or more encryption keys to securely transmit messages to the mobile device in response to determining the mobile device is in the sub-location.

7. The access control system of claim 1, wherein the at least one processor is to authenticate the mobile device based on a token received from the mobile device before validating the user.

8. The access control system of claim 7, wherein the mobile device sends the token for authentication, user credentials for the user, and the mobile device identifier to the server in a single message, and the at least one processor is to authenticate the mobile device and validate the user in a single message exchange with the mobile device.

9. The access control system of claim 1, wherein to determine whether a user associated with the mobile device is validated, the at least one processor is to determine whether a request is received to validate the user and another user associated with the user, and in response to determining that the request to validate the user and another user is received, including a special command in the validation signal to invoke opening the physical barrier to allow the user and the another user to pass together through the sub-location into the restricted area.

10. The access control system of claim 1, wherein a fare associated with accessing the restricted area is paid from a user account to validate the user.

11. A non-transitory computer readable medium of an access control server controlling access to a restricted area, wherein the non-transitory computer readable medium stores machine readable instructions executable by at least one processor of the access control server, to:

receive a mobile device identifier from a mobile device, wherein the mobile device identifier is calculated by the mobile device based on information received from at least one beacon, the at least one beacon being associated with a sub-location of a plurality of sub-locations within the restricted area;

determine a proximity of the mobile device to a sub-location of the plurality of sub-locations;

determine whether the mobile device is in a sub-location of the plurality of sub-locations based on the determined proximity of the mobile device to the sub-location;

in response to a determination that the mobile device is in the sub-location, determine whether a user associated with the mobile device is validated to access the restricted area; and in response to determining the user is validated, send a validation signal to at least one of an actuator driver circuit and the mobile device to invoke opening a physical barrier associated with the sub-location.

12. The non-transitory computer readable medium of claim 11, wherein the access control server sends the validation signal to the actuator driver circuit to open the physical barrier.

13. The non-transitory computer readable medium of claim 11, wherein the mobile device identifier is unique to the sub-location when compared to identifiers for other sub-locations of the plurality of sub-locations.

14. The non-transitory computer readable medium of claim 11, wherein the at least one processor uses one or more encryption keys to securely transmit messages to the mobile device in response to determining the mobile device is in the sub-location.

15. The non-transitory computer readable medium of claim 14, wherein the securely transmitted messages authenticate the mobile device and the access control server, and
if the mobile device is authenticated, the securely transmitted messages include the validation signal.

16. The non-transitory computer readable medium of claim 11, wherein the mobile device detects when it is in the sub-location and enters into an activation mode to send location information for the sub-location and user validation information to the access control server.

17. The non-transitory computer readable medium of claim 16, wherein the mobile device sends the user validation information to the access control server in response to a determination that the mobile device is in the activation mode.

18. A mobile device comprising:

at least one short-distance communication interface to receive a beacon identifier from at least one beacon;

a data storage to store an operating system and an access control application; and a processor to execute the operating system, wherein the operating system determines whether the received beacon identifier is a registered beacon identifier, and in response to a determination that the received beacon identifier is a registered beacon identifier, the processor launches the access control application stored on the mobile device, wherein the access control application, in response to being launched, is executed by the processor, and the access control application determines whether the mobile device is at a sub-location of an access control area associated with a restricted area, wherein the access control area includes a plurality of sub-locations, wherein in response to determining the mobile device is at the sub-location, the access control application enters into an activation mode and calculates a mobile device identifier for the mobile device based on the beacon identifier, wherein the mobile device identifier is valid for only the sub-location where the mobile device is currently located, and wherein the access control application sends the mobile device identifier to a server to validate a user associated with the mobile device and to allow access to the restricted area through the sub-location if the user is validated.

19. The mobile device of claim 18, wherein at least one sensor, disposed on at least one of the mobile device and the at least one beacon, provides a signal to open a physical barrier to allow the user to enter the restricted area if validated and provides a signal to close the physical barrier after the user enters the restricted area.

20. The mobile device of claim 18, wherein the mobile device receives a beacon identifier from each of a plurality of beacons, and to calculate the mobile device identifier, the processor:

selects a particular beacon of the plurality of beacons based on signal strength of each beacon of the plurality of beacons;

calculates the mobile device identifier based on the selected beacon; and ensures the mobile device is in a desired proximity of the selected beacon based on an analysis of azimuth, angle, and distance, of the mobile device relative to the selected beacon.

* * * * *